US011946710B1

(12) United States Patent
Hellum

(10) Patent No.: US 11,946,710 B1
(45) Date of Patent: Apr. 2, 2024

(54) SYSTEM AND METHOD FOR AUTHORIZING AND EXECUTING SAFE SEMI-AUTONOMOUS ENGAGEMENT OF A SAFETY-CRITICAL DEVICE

(71) Applicant: KONGSBERG DEFENCE & AEROSPACE AS, Kongsberg (NO)

(72) Inventor: Pål Longva Hellum, Blommenholm (NO)

(73) Assignee: KONGSBERG DEFENCE & AEROSPACE AS, Kongsberg (NO)

( * ) Notice: Subject to any disclaimer, the term of this patent is extended or adjusted under 35 U.S.C. 154(b) by 0 days.

(21) Appl. No.: 17/958,945

(22) Filed: Oct. 3, 2022

(51) Int. Cl.
*F41A 17/06* (2006.01)
*F41A 19/69* (2006.01)
*F41A 27/28* (2006.01)
*H04L 9/40* (2022.01)

(52) U.S. Cl.
CPC ............ *F41A 17/063* (2013.01); *F41A 19/69* (2013.01); *F41A 27/28* (2013.01); *H04L 63/04* (2013.01)

(58) Field of Classification Search
CPC ........ H04L 63/04; F41A 17/063; F41A 19/69; F41A 27/28
See application file for complete search history.

(56) References Cited

U.S. PATENT DOCUMENTS

| 4,680,584 A * | 7/1987 | Newsom ................. F42C 15/42 367/134 |
| 6,412,207 B1 * | 7/2002 | Crye ...................... F41A 17/02 42/70.08 |
| 6,751,729 B1 * | 6/2004 | Giniger ............... H04L 63/0823 713/153 |
| 8,109,191 B1 * | 2/2012 | Rudakevych ........... F42C 15/42 89/41.01 |
| 10,063,522 B2 | 8/2018 | Hellum et al. |
| 2004/0050240 A1 * | 3/2004 | Greene ................... F41A 23/24 89/41.06 |
| 2006/0249010 A1 * | 11/2006 | John ....................... F41A 19/68 89/1.11 |

(Continued)

OTHER PUBLICATIONS

International Search Report and Written Opinion of the International Searching Authority, issued in International Application No. PCT/EP2023/077243 dated Jan. 9, 2024.

*Primary Examiner* — Joshua E Freeman
(74) *Attorney, Agent, or Firm* — NIXON & VANDERHYE

(57) ABSTRACT

Disclosed is a system and method for authorizing and executing safe semi-autonomous engagement of a safety critical firing device at a remote location. A Human Machine Interface at the near location has an input including a hardware safety barrier and hardware barrier communication unit with interfaces connected to a network. At the remote location, a control unit and an Robotic Operator Server are connected to a fire control system of the safety critical firing device and to the network. The Robotic Operator Server includes software for detecting and locking to a target and for providing authorization information to the Human Machine Interface, and to transfer trigger signals to the fire control system when authorization of engagement is confirmed by an operator via a control panel. The safety critical firing device is engaged if all of activation control, arming control, and trigger signals are present in the fire control system.

14 Claims, 3 Drawing Sheets

(56) References Cited

U.S. PATENT DOCUMENTS

| | | | |
|---|---|---|---|
| 2008/0020354 A1* | 1/2008 | Goree | F41G 3/04 |
| | | | 434/11 |
| 2008/0121097 A1* | 5/2008 | Rudakevych | F41H 7/005 |
| | | | 901/1 |
| 2009/0120275 A1* | 5/2009 | Chukwu | F41G 3/165 |
| | | | 89/41.05 |
| 2010/0263524 A1* | 10/2010 | Morin | F42D 5/04 |
| | | | 901/1 |
| 2010/0269674 A1* | 10/2010 | Brown | G08B 15/00 |
| | | | 89/1.11 |
| 2010/0278086 A1* | 11/2010 | Pochiraju | H04W 28/20 |
| | | | 370/310 |
| 2014/0304799 A1 | 10/2014 | Hellum | |

* cited by examiner

SYSTEM AND METHOD FOR AUTHORIZING AND EXECUTING SAFE SEMI-AUTONOMOUS ENGAGEMENT OF A SAFETY-CRITICAL DEVICE

BACKGROUND OF THE INVENTION

Field of the Invention

The present invention relates to a system and method for authorizing and executing safe semi-autonomous engagement of a safety critical firing device at a remote location.

Description of the Related Art

Secure operations of safety-critical devices are vital. For remote controlled operations several measures are standardized and required to operate safety-critical devices. This is especially the case in the defense industry where malfunctioning weapons may have fatal consequences. This industry is moving towards standardized platforms and infrastructures for safe operation from a near location of safety-critical devices at a remote location. In these platforms all systems are required to interoperate over packet-based networks. The operator positions become multipurpose operator positions shared between several systems. The interface between the system and the operator positions thus changes.

The applicant has previously developed a solution where safety-critical operations at a remote location (far end) are controlled at a local location (near end) via a non-secure network and Control Panel Interfaces (CPI) at each location. The CPI interfaces provide a secure communication tunnel through the non-secure network. The solution is described in applicant's own U.S. Pat. No. 10,063,522 B2, which is hereby included as a reference, provides a secure way of enabling and controlling operations of a safety-critical device located at the remote location.

The safety-critical device may for instance be a weapon firing circuitry and/or a weapon movement circuitry located at a remote location, and where these are operated from a near location.

The non-secure communication network may be a packet-based communication network, such as an Internet Protocol (IP) network. The secure communication tunnel may be an IPsec tunnel for the barrier control signals. The IPsec tunnel may be configured in an integrity only mode, where IPsec receivers authenticate barrier control signals sent by IPsec transmitters to ensure that the data has not been altered during transmission. The barrier circuits may further be configured with a configurable or fixed IP addressing scheme. The configurable scheme may by a dynamic scheme. By encapsulating barriers with fixed IP addressing higher safety is achieved.

The communication through the secure communication tunnel may employ a protocol which includes timestamping of data. Such aspects are described in the reference U.S. Pat. No. 10,063,522 B2 and will also apply for the new solution disclosed herein.

In a particular aspect, an operating input device may include a video session information device, and the safety-critical device may be a video confirmation device. In this aspect, the system may further comprise a video distribution device.

A video distributing device may be arranged at the safety-critical device to provide a video signal which is transferred through the non-secure communication network and displayed on a display screen at the near end. Further, a video session information device at the near end may be configured to derive video session information from the video signal and transfer the video session information through the secure communication tunnel. Further, the video confirmation device may be configured to confirm the authenticity of the video signal transferred through the non-secure communication network. These aspects of a video session information device have been explained in closer detail said reference U.S. Pat. No. 10,063,522 B2.

When distributing data requiring high bandwidth, such as video, stable and high-quality radio communication is not easily guaranteed, and signal transmission will have a relatively short range compared to radio communication with low bandwidth.

Signal transmission for performing safety-critical operations such as controlling of movements and firing of a weapon station at a remote location will not require high bandwidth. This can thus be performed through a hardware (HW) barrier while video can be transferred via different channels.

Authorization to proceed (AtP) in relation to weapon systems using autonomy and Artificial Intelligence (AI) is linked to ethical principles, and for a person to monitor and deactivate misbehaving AI systems is an absolute requirement.

The Department of Defense (DoD) in the United States has recommended a set of guiding principles for the use of autonomous weapon systems. One of these principles is that the system must be governable i.e. that the design of AI capabilities shall fulfill their intended functions while possessing the ability to detect and avoid unintended consequences, and the ability to disengage or deactivate deployed systems that demonstrate unintended behavior.

The operational levels may be defined as:
1. Teleoperated, man-in-the loop where a safety critical device is controlled from a remote operator position.
2. Assisted, man-in-the loop where a safety critical device is controlled from a remote operator position. The operator is assisted by support functionality to enhance the operation.
3. Semi-autonomous target acquisition (TA), man-in-the loop, where a safety critical device is performing autonomous supervision and Target Acquisition (TA). The safety critical device prepares the system for the human operator inspection and/or Target Engagement (TE).
4. Semi-autonomous TE, man-in-the loop, where a safety critical device is performing autonomous supervision and target acquisition. Target engagement is authorized from the operator position based on information provided by the safety critical device.
5. Pre-Authorized TE, supervised man-on-the loop, where a safety critical device is authorized for a limited engagement, while retaining human supervision. This can for instance be defined by a class of objects in a predefined area. The safety critical device is performing autonomous supervision, target acquisition and within the defined bounds, engagement.

For scenarios involving Robotic Combat Vehicles (RCV), authorization to proceed is given by one or more operators. It is then vital that there is fail-safe way to provide authorization and of supervising and stopping initiated operations. This is especially the case for scenarios, where the initiated operations are performed by Artificial Intelligence (AI) capabilities of a device at a remote location.

The system described above for operating a safety-critical device via a non-secure network, provides a solution suitable used for systems to transport safety barriers and signaling over IP/Ethernet networks and to provide an teleoperation capability, i.e. to manually control a safety-critical device utilizing available radio communication. Teleoperation is a solution compliant with levels 1 to 3 above.

While all levels require safe operation, levels 4 and 5 are associated to stricter ethical aspects and rules and require a different solution with even higher security as the firing must be activated by a robotic operator at a remote location.

The Pentagon har set clear rules for the ethical use of Remote Combat Vehicles (RCVs) where the possibility to supervise and interrupt a misbehaving weapon system is mandatory. This means that a radio communication to the RCV must always be present, i.e. have high availability such as for instance UHF.

The concept of a dual radio solution is the result of the recognition that the high bandwidth radios will not provide sufficient geographical coverage and that in order to reduce the requirements on the radio communication, the RCV level of autonomy must be increased. In a dual radio solution, operational autonomy levels 1 to 3 can be carried on a high bandwidth radio, while operational autonomy levels 4 and 5 requiring authorization of engagement is carried on a high availability radio.

The applicant has developed the dual radio communication solution with hardware safety barrier for operating a safety-critical device via a non-secure network and providing disengagement of operations of the safety-critical device. This complies with operational autonomy levels 3 to 5 and is called the E-stop solution. It is disclosed in U.S. application Ser. No. 17/577,068 (filed Jan. 17, 2022), which is hereby included as a reference.

To fully comply with operational autonomy levels 4 and 5, different alternatives have been evaluated and discarded. One was to isolate different Software (SW) tasks representing the procedural steps of the safety process on an Extended Capability Computer (ECC) which is a Robotic Operator Server (RO-S) detecting and identifying a target and based on this control the operation of a safety critical device. Another alternative was to use a separate HW card (CPI Interface Safety Client, CISC) connected to the ECC providing a safety interface to the fire control system (MPU). The weakness of the different evaluated alternatives is that the decision point of the Robotic Operator is a single one, and true diversity cannot be established easily.

The purpose of the present invention is to provide a system and method that comply with operational levels 4 and 5 by providing a diversified and safe solution for the human operator to authorize the Robotic Operator (RO) to fire a weapon. The secondary purpose being to enable the safety approved fire control SW on the Main Processing Unit (MPU) of the safety critical device to be unaffected by the use of a RO and to maintain a consistent safety architecture by regarding the RO as any other operator in a multi-user configuration. The MPU provides the fire control system of the safety critical firing device.

The solution thus enables safe handling of firing from a RO operating according to level 4 and 5, while not introducing any major architectural changes to a fire control system of a safety critical device.

The solution described provides true diversity and meets the strict safety requirements related to operational autonomy level 4 and 5 where the safety critical device performs autonomous supervision and target acquisition. For level 4, target engagement is authorized over a high availability radio from an operator position at a near location based on information provided to the operator by the safety critical device.

SUMMARY OF THE INVENTION

The invention relates to a system and method for authorizing and executing safe semi-autonomous engagement of a safety critical firing device at a remote location.

The system comprises:
at a near location, a Human Machine Interface with input means comprising at least one hardware safety barrier and hardware barrier communication means with interfaces connected to a network providing at least three different signal communication channels, a first signal communication channel for carrying activation control signals (PALM), a second signal communication channel for carrying authorization signals and a third signal communication channel for carrying arming control signals (ARM),
at the remote location, a control unit and a Robotic Operator Server connected to a fire control system of the safety critical firing device and to the network, where the control unit is adapted to receive the activation control signal (PALM) carried on the first signal communication channel, and where the control unit comprises at least one hardware safety barrier and hardware barrier communication means with interfaces connected to the network, making the third signal communication channel as a closed loop signal communication channel between the hardware safety barriers of the Human Machine Interface and the control unit for transferring the arming control signals (ARM) to a fire control system of the safety critical firing device via the control unit, and where the Robotic Operator Server comprises software, SW, for detecting and locking to a target and for providing authorization information via the second signal communication channel of the network to the Human Machine Interface, and to transfer trigger signals (TRIG) to the fire control system when authorisation of engagement is confirmed by an operator via the control panel, and
where the safety critical firing device is engaged if all of activation control signals (PALM), arming control signals (ARM) and the trigger signals (TRIG) are present in the fire control system.

The different devices and units comprised in the system enables diversity by providing three different signal communication channels, one for each activation signal, i.e. PALM, authorization to proceed and ARM signals.

In one embodiment, the network is a high availability radio network. This ensures that the availability of the safety critical signals between the Human Machine Interface and the safety critical device is improved.

In one embodiment, the connections between the controller unit, controlling authorization to proceed (AtP), and the fire control system (MPU) are hardwired.

In one embodiment, the system further comprises an additional radio communication channel providing high band width radio signals for manually monitoring and controlling operations of the safety critical firing device.

In one embodiment, the system further comprises a switch connected to the hardware barrier of the Human Machine Interface for connecting or disconnecting the closed loop signal communication channels between the safety barriers of the control panel and the control unit.

The invention is further defined by a method for authorizing and executing safe semi-autonomous engagement of a safety critical firing device at a remote location. The method comprises:

providing, at a near location, a Human Machine Interface with input means comprising at least one hardware safety barrier and hardware barrier communication means with interfaces connected to a network providing at least three different signal communication channels, providing, at the remote location, a control unit and connecting it to a fire control system of the safety critical firing device and to the network, where the control unit comprises at least one hardware safety barrier and hardware barrier communication means with interfaces connected to the network, making a closed loop signal communication channel carried on the network between the hardware safety barrier of the Human Machine Interface and the control unit, transmitting control signals, carried on a first signal communication channel of the network, from the Human Machine Interface to the control unit, where the signals comprise activation control signals (PALM) for activating the safety critical firing device, transferring the activation control signals (PALM) from the control unit to the fire control system of the safety critical device, when activated, the safety critical firing device executes integrated target detection SW on an Robotic Operator Server for detecting and locking on a target, providing authorization information carried on a second signal communication channel of the network to the Human Machine Interface, and requesting authorization for engagement, transmitting arming control signals (ARM) from the Human Machine Interface to the control unit over a third signal communication channel carried on the closed loop signal communication channel of the network when authorization of engagement is confirmed by an operator via the Human Machine Interface, transferring the arming control signals (ARM) from the control unit to a fire control system of the safety critical device for arming a selected firing device, transferring a trigger signal (TRIG) from the Robotic Operator Server to the fire control system, if authorization is provided through the arming control signals (ARM), and if locked on target is consistent, engaging the safety critical firing device if the following criteria are met: the fire control system receives the activation control signals (PALM) and the arming control signals (ARM) from the control unit as an authorization from the operator, the authorization is confirmed and the fire control system receives the trigger signal (TRIG) from the Robotic Operator Server.

In one embodiment, the control signals are transmitted over a network providing high availability radio signals.

In one embodiment, a confidence level for a locked target is raised in the period from the authorization is requested until authorization is confirmed. This will ensure that the authorization provided to the RO is used to engage the same target as the authorization request was provided for.

In one embodiment, the authorization information provided by the Robotic Operator Server to the Human Machine Interface comprises information presented in maps showing positions of own forces, locked target(s), safety critical firing device.

In one embodiment, damage assessment information is transmitted from the Robotic Operator Server to Human Machine Interface via the second signal communication channel of the network.

In one embodiment, configuration signals (Config RO) for configuring SW controlling the safety critical firing device is transmitted via the Human Machine Interface to the Robotic Operator Server.

In one embodiment, the arming control signal (ARM) is instantiated where one instance defines which weapon to arm. i.e. an operator can, based on type of locked target, select suitable weapon(s).

In one embodiment, the manual control of the safety critical firing device is performed via High Band Width radio signals.

BRIEF DESCRIPTION OF THE DRAWINGS

The invention will now be described in detail with reference to the figures illustrating examples of implementations.

DESCRIPTION OF THE PREFERRED EMBODIMENTS

As mentioned in the background section above, there is a need for a solution which is compliant with safety requirements for operating a safety critical device at operational level 4 and 5. For doing this, the solution provides the following:

The High Availability radio that is always present for communication between the safety critical device and an operator authorizing engagement.

Using the E-stop solution with dual radio safe protocol communication with hardware safety barrier for operating a safety-critical device via a non-secure network and providing disengagement of operations of the safety-critical device.

True diversity of safety barriers.

The MPU fire control system on the MPU is unaffected by the introduction of the RO.

Authorization information and procedures.

Supervision and interruption solutions.

To provide fail safe operational levels 4 and 5, three different signal communication channels are applied for each of activation control signals (PALM), authorization signals and arming control signals (ARM). These signals are carried as different signal communication channels and preferably over high availability radio with restricted available bandwidth. Each communication channel is continuously diagnosed for loss of connectivity or transmission errors where any severe fault sets the system to a safe state through the deactivation of the relevant barrier carrying the signal.

The new solution comprises a hardware (HW) barrier for carrying the arming control signal (ARM). For this, the described CPI interface may be used to provide a closed loop control over a network and through this, reliable transmission of the HW barrier signal from the operator to the MPU. Although the CPI interface is used as an example of a HW barrier that may be used, other HW barrier solutions are feasible. Reliable activation/disengagement of one of the barriers for the operations of a safety-critical device is performed by activating a physical switch. However, further features are implemented in the new solution providing even higher security to be compliant with level 4 and 5 operations.

Figure 1:
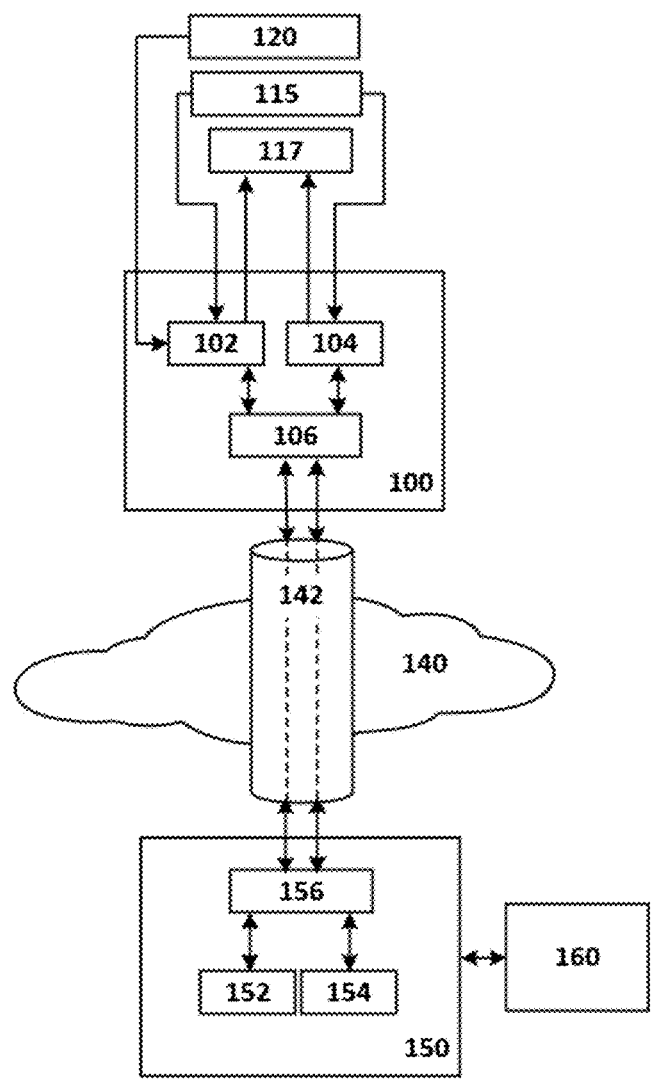
FIG. 1 is a schematic block diagram illustrating the previously developed E-stop system used for a safety critical device.

FIG. 1 is a schematic block diagram illustrating one embodiment of a system with HW barriers, where one HW barrier is used for arming control signals (ARM) carried to the safety-critical device 160 via a secure communication channel 142 of a non-secure network 140, and for providing reliable engagement and disengagement of arming operations of the safety-critical device 160 by activating a physical switch 120, i.e. the ARM switch. The safety critical device 160 may for instance be a robotic combat vehicle (RCV) with a weapon station (WS).

The HW barrier at a near location where an operator is located comprises a first control panel interface 100 connected to an input device 120. The input device 120 is an arming control device for enabling an arming control signal (ARM).

The HW barrier is adapted for transmitting the arming control signals (ARM) to the safety-critical device 160 at a remote location. The first control panel interface 100 comprises hardware barrier communication means 106 and a hardware safety barrier 102 with safety barrier interface. The figure illustrates an example where the operating input device 120 is connected to the hardware barrier 102. The hardware safety barrier 102 is further connected to the hardware barrier communication means 106 for safe communication through the non-secure network 140.

The status of the circuit of the fire control system (MPU) receiving the arming control signals (ARM) is sampled and signaled back to the local operator position such that a user can see the actual status of the ARM circuitry on the MPU.

The non-secure communication network 140 may be a packet-based communication network, such as an Internet Protocol (IP) network.

The HW barrier further comprises a second control panel interface 150, connected to the safety-critical device 160 at the remote location, and which is adapted for receiving the arming control signals (ARM) from the first control panel interface 100. The second control panel interface 150 comprises hardware barrier communication means 156 and at least a hardware safety barrier 152 with safety barrier interface connected to the hardware barrier communication means 156 for communication through the non-secure network 140.

The figure also illustrates an embodiment further comprising a switch 115, connected to the first and a second hardware safety barrier 102, 104 of the first control panel interface 100, the switch 115 controlling Hi- and Lo-signal inputs on the hardware safety barriers, such that a Hi-signal is input on the first hardware safety barrier 102 and a Lo-signal is input on the second hardware safety barrier 104 and vice versa for respectively enabling and disengaging the safety-critical device 160. FIG. 1 also shows an embodiment where a light source 117 is connected to the first and second safety barriers 102, 104 of the first control panel for indicating status of the safety-critical device 160. How the HW barrier comprising a switch 115, referred to as an E-stop, and a light source 117 works is explained in detail in said U.S. application Ser. No. 17/577,068.

Figure 2:
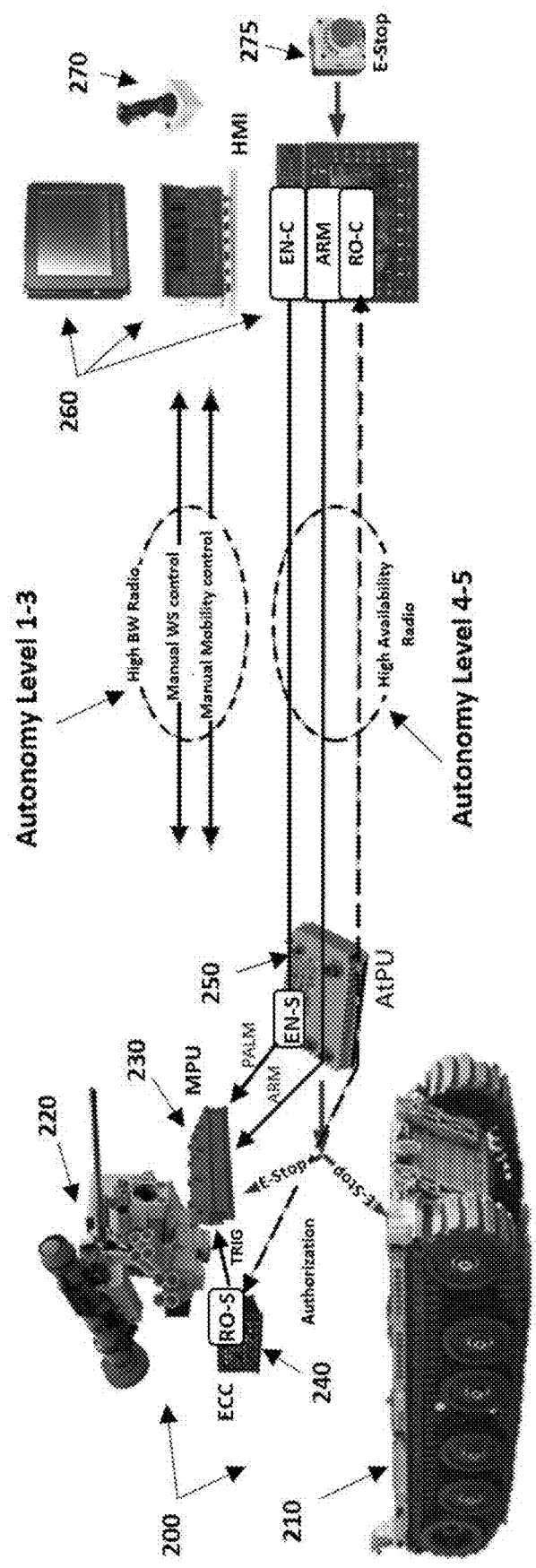
FIG. 2 illustrates the diverse firing barriers communicated over the high availability radio interface.

FIG. 2 illustrates a dual radio solution where safety critical signals controlling engagement of a safety critical device 200, that can be operated as a Robotic Operator (RO), are carried over high availability radio interface to and from the RO, while other signals are carried over a high bandwidth radio. An RO typically comprises several different modules such as modules for Treat Acquisition, Target Acquisition, Authorization Server and a Robotic Fire controller. The dual radio solution meets the requirement related to all operational autonomy levels 1 to 5. Signals for operational autonomy levels 1 to 3 can be carried on a high bandwidth radio, while signals for operational autonomy levels 4 and 5 is carried on a high availability radio. The safety critical device 200 may comprise a robotic combat vehicle (RCV) 210 with a weapon station (WS) 220.

An operator at a Human Machine Interface 260 can seamlessly switch between autonomous operation of the safety critical device 200 by confirming authorization to proceed, and manual mobility control of the robotic combat vehicle 210 as well as manual control of the weapon station 220 by operating input means 270 connected to the Human Machine Interface 260.

A main component of the solution is a control unit 250 which is an Authorization to Proceed Unit (AtPU). This may comprise the CPI solution interfacing to the High Availability radio connection. It may also provide the E-Stop capability.

An operator enables autonomous mobility and motion of the safety critical device 200 by enabling the RO of the safety critical device 200 to control take control. The fire control system 230 (MPU) arbitrates based on the PALM signal to the MPU from the AtPU. This means that the handover of control to the RO does not require any special tailoring of the fire control SW and that the operator can take control any time if the High Bandwidth radio is available. The operator can revert to manual control by disabling the RO. The firing control system 230 is thus adapted to arbitrate between a robotic operator and a human operator.

In this solution, the arming control signals (ARM) are carried on a separate signal communication channels via said HW barrier and the signals can be connected or disconnected, thereby enabling or disabling arming control signals (ARM) transmitted to the firing control system 230 (MPU).

To obtain the required diversity for firing the weapon station 220, i.e. to be compliant with operational levels 4 and 5, an independent signal communication channels for activating and enabling (PALM) the safety critical device 200 is provided, as well as a separate signal communication channels for authorizing engagement.

Trigger signals (TRIG) are generated by the RO SW on the extended capability computer (ECC) of a Robotic Operator Server 240 connected to a main processing unit (MPU) of a firing control system 230 connected to the weapon station 220. The ECC is a rugged MOTS (Military Off-the-Shelf)) computer hosting RO-S(Robotic Operator Server SW) comprising Authorization Server SW for handling authorization requests and conformations).

Trigger signals are generated based provisioning of authorization (ARM) from the human operator.

The different units comprised in the system, and how they control the different signals are as following:

Human Machine Interface 260 (HMI): the arming signal (ARM) is controlled via a HW barrier, the Enable signal (PALM) is controlled by separate Enable Client SW (EN-C) and Enable Server SW (EN-S), and the authorization signal (TRIG) is controlled by separate Robotic Operator Client SW (RO-C) and Robotic Operator Server SW (RO-S).

Control unit 250 (AtPU): the arming signal (ARM) is a HW signal transmitted transparently through the AtPU, the Enable signal (PALM) is controlled by separate SW for activating a HW signal, the authorization signal (TRIG) is transmitted transparently trough the AtPU.

Robotic Operator Server 240 (ECC): the arming signal (ARM) is not applicable, only status is received from the fire control system 230 (MPU), the Enable signal (PALM) is not applicable, only status is received from the fire control system 230 (MPU), the authorization signal (TRIG) is controlled by separate SW for activating a HW signal.

The fire control system 230 (MPU) comprises a standard safety design with ARM, PALM and TRIG applied as separate safety barriers.

This means that regardless of what errors might occur, two additional units for controlling firing will ensure that unintended firing will not happen.

If an error occurs in the Human Machine Interface 260 (HMI), three independent units must fail within the same time interval as the ECC request authorization.

If an error occurs in the Control unit 250 (AtPU), two independent units must fail within the same time interval as the ECC request authorization. The same applies for the Robotic Operator Server 240 (ECC).

The operation of the fire control system 230 (MPU) is unchanged with regards to normal operation.

Figure 3:
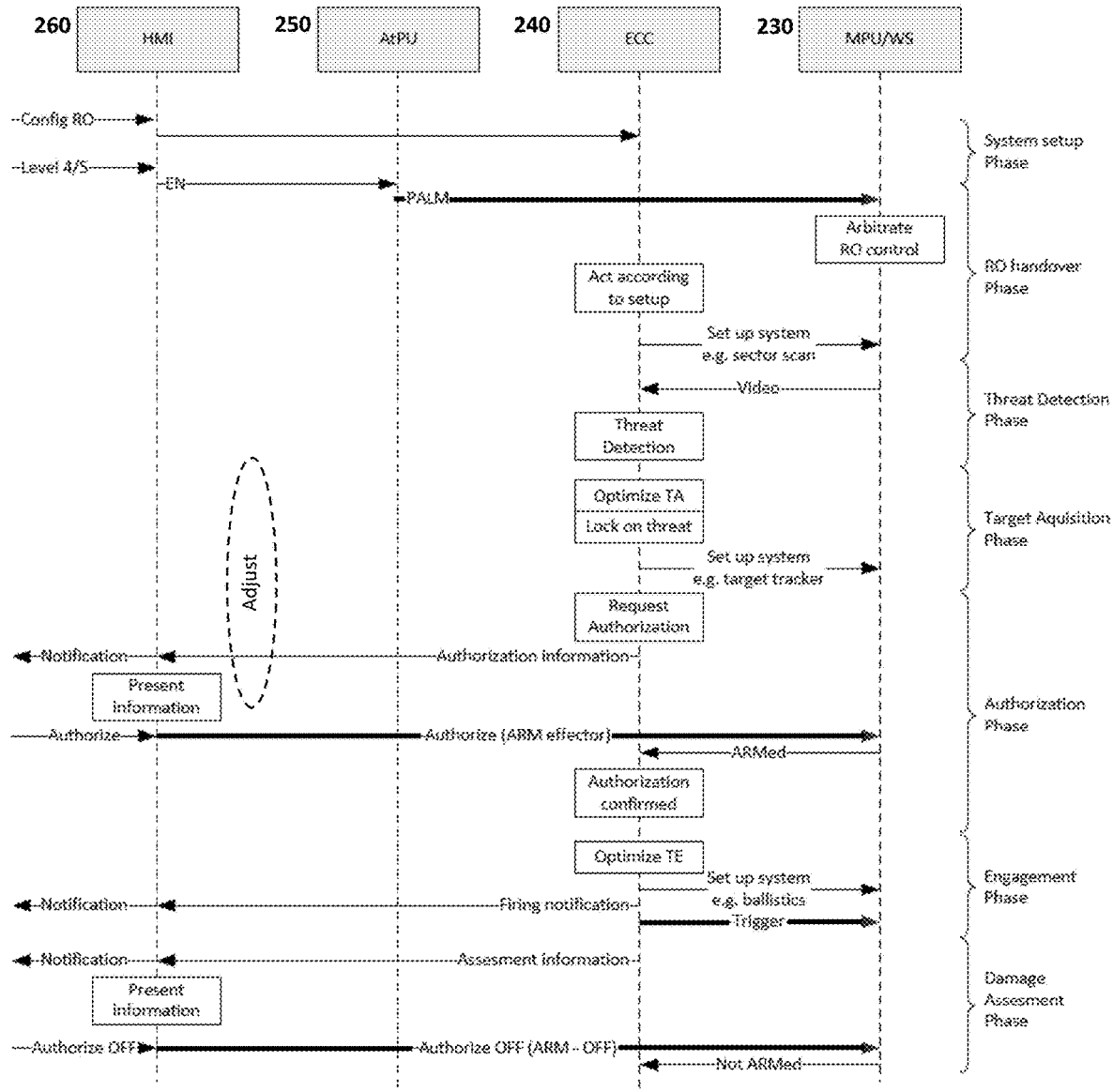
FIG. 3 illustrates an example of an authorization sequence.

FIG. 3 illustrates how the HW described above interact for providing an authorization sequence compliant with safe operational levels 4 and 5.

The figure illustrates the signal flow between the different HW devices comprised in the system. As indicated in the figure, signals are transferred between the Human Machine Interface 260 (HMI), the control unit 250 (AtPU), the Robotic Operator Server 240 (ECC), and the fire control system 230 (MPU) of the weapon station 220 (WS). The thick black lines indicate the signals that can be disconnected by the E-stop.

A first phase can be a system setup phase where configuration (Config RO) is transferred from the Human Machine Interface 260 to the Robotic Operator Server 240. The SW may for instance comprise detection rules, firing rules, locked to target rules etc. that apply to an area the safety critical device 200 is operating in.

In a handover phase, where the safety critical device 200 is activated to operate as a Robotic Operator (RO), an enable signal (EN) is transmitted from the Human Machine Interface 260 via a first signal communication channels provided by a secure SW communication channel via CPI signalling to the control unit 250, which forward this as activation control signals (PALM) to the fire control system 230.

When activated, the RO will initiate Automatic Target Recognition (ATR), which is a threat detection phase and typically perform a sector scan for threat detection following detecting rules controlled by the SW installed in the Robotic Operator Server 240.

The Robotic Operator (RO) threat detection algorithms, which are typically Convolutional Neural Networks, are set to report threats which exceed a predefined confidence level. During the time from requesting authorization until authorization is given the confidence level for the maintenance of target tracking is raised. It is paramount to ensure that the authorization provided to the RO is used to engage the same target as the authorization request was provided for. This authorization confirmation which ensures the validity of the authorization also requires a maintained/uninterrupted target track, authorization timeouts and possibly target positional boundaries.

Video of detected threats is captured by the safety critical device 200 and transferred to the fire control system 230 which forward this to the Robotic Operator Server 240 running the SW defining detection rules etc.

When a threat is detected, a target acquisition phase is initiated, where the Robotic Operator Server 240 will assess and interpret the captured video and possibly optimize target acquisition before locking on a target. These control signals are transmitted to the fire control system 230.

When locked on a threat, the next phase is an authorization phase where the Robotic Operator Server 240 requests authorization by transmitting authorization information carried on the second signal communication channels of the network to the Human Machine Interface 260 for presentation to an operator, thereby requesting authorization for engagement. The authorization information may comprise still images, positions and threat classes which is provided in a suitable user interface e.g. position of the threat and WS in a map as well as sufficient additions information such as positions of own forces.

An operator of the Human Machine Interface 260 can then, based on the presented authorization information, authorize firing of a safety critical firing device 200 by activating transmission of authorization signals from the Human Machine Interface 260 to the fire control system 230. The authorization signals are transported as a HW barrier signal, preferably over the high availability radio, to the fire control system 230 via the control unit 250. Different types of weapon to arm, e.g. gun/missile, are selected by an operator and corresponding arming signals are transported over the HW barrier.

The status of arming signals (ARM) are then transmitted from the fire control system 230 to the Robotic Operator Server 240 confirming authorisation and which weapon(s) to arm. Based on this information, the RO will change status and an autonomous target engagement phase is initiated. The Robotic Operator Server 240 will prior to the engagement confirm the authorization by evaluating a set of criteria such as:

Has target lock with a high confidence level been maintained during the authorization period?
Has the authorization been received within an acceptable time?
Have all system states been stable during the authorization phase?

If so, the Robotic Operator may optimize parameters, e.g. ballistics, for target engagement (TE) prior to activating the trigger to engage the target.

A fire notification is then transmitted from the Robotic firing controller 240 to the Human Machine Interface 260 prior to transferring a trigger signal (TRIG) to the fire control system 230.

Engagement of the fire control system is performed when the activation control signals (PALM), the arming control signals (ARM), and the trigger signal (TRIG) are received by the fire control system 230.

In a last phase, damage assessment is performed by transmitting information from the Robotic firing controller 240 to the Human Machine Interface 260 for presentation to the operator.

The operator can then deactivate the authorization signal transmitted to the fire control system 230 which in turn will transmit the status of the deactivated arming signal to the Robotic Operator Server 240.

FIG. 3 does not show the continuous supervision of the safety critical device 200 by the operator. This includes information such as weapon system positions, Line of Sight (LoS) directions, Field of View (FoV) and status in addition to platform position, movements and status.

The solution presented herein provides diversity as well as letting an autonomous firing system (RO) activate a trigger.

This is achieved by:

letting Enable signals (PALM) be set by the control unit 250, i.e. the Authorization to Proceed Unit (AtPU).

letting the arming control signals (ARM) by carried over a HW barrier (via AtPU) to the fire control system 230 (MPU), where the AtPU provides a safe verification of the transferred signal.

letting the Robotic Operator Server 240 (ECC) detect target and request authorization, and after this is given, activate the trigger by transmitting a trig signal (TRIG) to the fire control system 230 (MPU)

the three different signal communication channels for carrying PALM, ARM and authorization signals are continuously diagnosed for loss of connectivity or transmission errors where any severe fault sets the system to a safe state through the deactivation of the relevant barrier.

Acronyms and Abbreviations

AI Artificial Intelligence
AtP Authorization to Proceed
AtPU AtP Unit
ATR Automatic Target Recognition
CISC CPI Interface Safety Client
CPI Control Panel Interface
DoD Department of Defence
ECC Extended Capability Computer
FoV Field of View
HMI Human Machine Interface
IOP Unmanned Ground Vehicle (UGV) Interoperability Profile
IP Internet Protocol
LoS Line of Sight
MPU Main Processing Unit
RCV Robotic Combat Vehicle
RO Robotic Operator
TA Target Acquisition
TE Target Engagement
WS Weapon Station

The invention claimed is:

1. A system for authorizing and executing safe semi-autonomous engagement of a safety critical firing device at a remote location, the system comprises:

at a near location, a Human Machine Interface with input means comprising at least one hardware safety barrier and hardware barrier communication means with interfaces connected to a network providing at least three different signal communication channels, a first signal communication channel for carrying activation control signals (PALM), a second signal communication channel for carrying authorization signals and a third signal communication channel for carrying arming control signals (ARM), at the remote location, a control unit and a Robotic Operator Server connected to a fire control system of the safety critical firing device and to the network, where the control unit is adapted to receive the activation control signals (PALM) carried on the first signal communication channel, and where the control unit comprises at least one hardware safety barrier and hardware barrier communication means with interfaces connected to the network, making the third signal communication channel as a closed loop signal communication channel between the hardware safety barriers of the Human Machine Interface and the control unit for transferring the arming control signals (ARM) to a fire control system of the safety critical firing device via the control unit, and where the Robotic Operator Server comprises software, SW, for detecting and locking to a target and for providing authorization information via the second signal communication channel of the network to the Human Machine Interface, and to transfer trigger signals (TRIG) to the fire control system when authorisation of engagement is confirmed by an operator via the control panel, and where the safety critical firing device is engaged if all of activation control signals (PALM), arming control signals (ARM) and the trigger signals (TRIG) are present in the fire control system.

2. The system according to claim 1, where the network is a high availability radio network.

3. The system according to claim 2, where the connections between the controller unit and the fire control system are hardwired.

4. The system according to claim 2, further comprising an additional radio communication channel providing high bandwidth radio signals for manually monitoring and controlling operations of the safety critical firing device.

5. The system according to claim 2, further comprising a switch connected to the hardware barrier of the Human Machine Interface for connecting or disconnecting the closed loop signal communication channels between the safety barriers of the control panel and the control unit.

6. A method for authorizing and executing safe semi-autonomous engagement of a safety critical firing device at a remote location, comprising:

providing, at a near location, a Human Machine Interface with input means comprising at least one hardware safety barrier and hardware barrier communication means with interfaces connected to a network providing at least three different signal communication channels, providing, at the remote location, a control unit and connecting it to a fire control system of the safety critical firing device and to the network, where the control unit comprises at least one hardware safety barrier and hardware barrier communication means with interfaces connected to the network, making a closed loop signal communication channel carried on the network between the hardware safety barrier of the Human Machine Interface and the control unit, transmitting control signals, carried on a first signal communication channel of the network, from the Human Machine Interface to the control unit, where the signals comprise activation control signals (PALM) for activating the safety critical firing device, transferring the activation control signals (PALM) from the control unit to the fire control system of the safety critical device, when activated, the safety critical firing device executes integrated target detection SW on an Robotic Operator Server for detecting and locking on a target, providing authorization information carried on a second signal communication channel of the network to the Human Machine Interface, and requesting authorization for engagement, transmitting arming control signals (ARM) from the Human Machine Interface to the control unit over a third signal communication channel carried on the closed loop signal communication channel of the network when authorization of engagement is confirmed by an operator via the Human Machine Interface, transferring the arming control signals (ARM) from the control unit to a fire control system of the safety critical device for arming a selected firing device, transferring a trigger signal (TRIG) from the Robotic Operator Server to the fire control system, if authorization is provided through the arming control signals (ARM), and if locked on target is consistent, engaging the safety critical firing device if the following criteria are met:

the fire control system receives the activation control signals (PALM) and the arming control signals (ARM) from the control unit as an authorization from the operator, the authorization is confirmed and the fire control system receives the trigger signal (TRIG) from the Robotic Operator Server.

7. The method according to claim 6, where the network is a network providing high availability radio signals.

8. The method according to claim 6, where a confidence level for a locked target is raised in the period from the authorization is requested until authorization is confirmed.

9. The method according to claim 6, where the authorization information provided by the Robotic Operator Server to the Human Machine Interface comprises information presented in maps showing positions of own forces, locked target(s), safety critical firing device.

10. The method according to claim 6, where damage assessment information is transmitted from the Robotic Operator Server to Human Machine Interface via the second signal communication channel of the network.

11. The method according to claim 6, where configuration signals (Config RO) for configuring SW controlling the safety critical firing device is transmitted via the Human Machine Interface to the Robotic Operator Server.

12. The method according to claim 6, where the arming control signal (ARM) is instantiated where one instance defines which weapon to arm.

13. The method according to claim 6, where manual control of the safety critical firing device is performed via High Band Width radio signals.

14. The method according to claim 6, comprising operating a switch connected to the hardware barrier of the Human Machine Interface for connecting or disconnecting the closed loop signal communication channels between the safety barriers of the control panel and the control unit.

* * * * *